United States Patent
Chang

(10) Patent No.: US 10,326,177 B2
(45) Date of Patent: Jun. 18, 2019

(54) APPARATUS FOR CONTROLLING THE CHARGING OF ELECTRIC VEHICLE

(71) Applicants: HYUNDAI MOTOR COMPANY, Seoul (KR); KIA Motors Corporation, Seoul (KR)

(72) Inventor: Jung Moon Chang, Suwon-si (KR)

(73) Assignees: HYUNDAI MOTOR COMPANY, Seoul (KR); KIA Motors Corporation, Seoul (KR)

(*) Notice: Subject to any disclaimer, the term of this patent is extended or adjusted under 35 U.S.C. 154(b) by 44 days.

(21) Appl. No.: 15/646,499

(22) Filed: Jul. 11, 2017

(65) Prior Publication Data

US 2018/0166750 A1    Jun. 14, 2018

(30) Foreign Application Priority Data

Dec. 9, 2016 (KR) .................. 10-2016-0167636

(51) Int. Cl.
*H02J 7/14* (2006.01)
*H01M 10/44* (2006.01)
(Continued)

(52) U.S. Cl.
CPC .......... *H01M 10/44* (2013.01); *B60L 3/04* (2013.01); *B60L 53/14* (2019.02); *B60L 58/22* (2019.02);
(Continued)

(58) Field of Classification Search
CPC .. B60L 11/1816; B60L 11/18; B60L 11/1851; B60L 11/1864; B60L 11/1866; B60L 2240/547; B60L 3/04; B60L 53/14; B60L 58/22; B60W 20/13; B60W 2510/244; B60W 2510/30; B60W 2710/244; H01M 10/44; H01M 10/4207; H01M 10/441; H01M 2220/20;
(Continued)

(56) References Cited

U.S. PATENT DOCUMENTS 6,402,530 B1    6/2002  Saito et al.
6,506,060 B2    1/2003  Sumida et al.
(Continued)

FOREIGN PATENT DOCUMENTS

KR        101023885 B1      3/2011
KR        20120003539 A     1/2012

*Primary Examiner* — Vuthe Siek
(74) *Attorney, Agent, or Firm* — McDonnell Boehnen Hulbert & Berghoff LLP

(57) ABSTRACT

An apparatus for controlling charging of an electric vehicle includes a switch unit including a first relay and second relays, wherein the first relay is arranged on an electric line through which a first battery is connected in series to a second battery. The first and second batteries supply driving power of the electric vehicle. The plurality of second relays is arranged on charging lines through which charging power is supplied to the first battery and the second battery, respectively. Further, a control unit configured to control the first relay and the plurality of second relays such that the first relay is turned off and the plurality of second relays is turned on to supply the charging power of a charger connected to a charging terminal to the first battery and the second battery, respectively, when the first battery and the second battery are charged.

18 Claims, 9 Drawing Sheets

(51) Int. Cl.
*B60W 20/13* (2016.01)
*B60L 11/18* (2006.01)
*H02J 7/00* (2006.01)
*H01M 10/42* (2006.01)
*B60L 3/04* (2006.01)
*B60L 53/14* (2019.01)
*B60L 58/22* (2019.01)

(52) U.S. Cl.
CPC ........ *B60W 20/13* (2016.01); *H01M 10/4207* (2013.01); *H01M 10/441* (2013.01); *H02J 7/0024* (2013.01); *B60W 2510/244* (2013.01); *B60W 2510/30* (2013.01); *B60W 2710/244* (2013.01); *H01M 2220/20* (2013.01); *H02J 7/0014* (2013.01); *Y02T 10/7055* (2013.01)

(58) Field of Classification Search
CPC ... H02J 7/0014; H02J 7/0024; B60Y 2200/91; Y02T 10/7005; Y02T 90/121; Y02T 10/7055
See application file for complete search history.

(56) References Cited

U.S. PATENT DOCUMENTS

| | | | |
|---|---|---|---|
| 2014/0125290 A1* | 5/2014 | Kim | H02J 7/0065 320/135 |
| 2015/0002073 A1* | 1/2015 | Ju | H02J 7/022 320/103 |

* cited by examiner

APPARATUS FOR CONTROLLING THE CHARGING OF ELECTRIC VEHICLE

CROSS-REFERENCE TO RELATED APPLICATION

This application is based on and claims the benefit of priority to Korean Patent Application No. 10-2016-0167636, filed on Dec. 9, 2016, in the Korean Intellectual Property Office, the disclosure of which is incorporated herein in its entirety by reference.

TECHNICAL FIELD

The present disclosure relates to an apparatus for controlling the charging of an electric vehicle.

BACKGROUND

An electric vehicle ("EV") is driven by using the electric energy of a high voltage battery to drive the vehicle, and also charges the battery.

An electric vehicle uses a battery as a main power source, and drives a motor using the power from the battery to obtain a driving force necessary for a vehicle.

A high-voltage battery is often used as the battery installed in such an electric vehicle.

In general, a passenger electric vehicle is equipped with a battery of about 360 V. Unlike passenger electric vehicles, a commercial electric vehicle such as an electric bus has a high-voltage system of 600 V or more. However, in such a commercial electric vehicle, when the output of the driving motor is high so that a low voltage is used, the efficiency may be lowered due to high current, and a problem may occur in safety.

In addition, when a high voltage of 600 V or more is used, due to a limitation of the charging standard, it is impossible to use the charger for an existing passenger vehicle and an expensive charger is required for a commercial electric vehicle.

An object of the present disclosure is to provide an apparatus for controlling the charging of an electric vehicle, which is capable of charging a battery of a commercial electric vehicle using a charger for a passenger electric vehicle.

Another object of the present disclosure is to provide an apparatus for controlling the charging of an electric vehicle, which is capable of charging a battery of a commercial electric vehicle using a charger for a passenger electric vehicle and meeting the voltage system requirements of a commercial electric vehicle by connecting chargers for a passenger electric vehicle in series to each other.

The technical problems to be solved by the present inventive concept are not limited to the aforementioned problems, and any other technical problems not mentioned herein will be dearly understood from the following description by those skilled in the art to which the present disclosure pertains.

According to one aspect of the present disclosure, an apparatus for controlling the charging of an electric vehicle includes a switch unit including a first relay and a plurality of second relays, wherein the first relay is arranged on an electric line through which a first battery is connected in series to a second battery, the first battery and the second battery are capable of supplying driving power for the electric vehicle, and the plurality of second relays are arranged on charging lines through which charging power is supplied to the first battery and the second battery, respectively, and a control unit configured to control the first relay and the plurality of second relays such that the first relay can be turned off and the plurality of second relays can be turned on to supply the charging power of a charger connected to a charging terminal to the first battery and the second battery, respectively, when the first battery and the second battery are charged.

The switch unit may include a first connector that connects one of the output terminals, to which the driving power of the first battery and the second battery is output, to the first charging terminal and a first terminal of the first battery, respectively, a second connector that connects the second charging terminal to a second terminal of the first battery, a third connector that connects the first charging terminal to the first terminal of the second battery, and a fourth connector that connects one of the output terminals and the second charging terminal to the second terminal of the second battery.

The second connector and the third connector may be connected to each other through an electric line, and the first relay may be arranged on the electric line.

When the first battery and the second battery are charged, the first terminal of the first battery and the first terminal of the second battery may be electrically connected to the first charging terminal through the first connector and the third connector, respectively, and the second terminal of the first battery and the second terminal of the second battery may be electrically connected to the second charging terminal through the second connector and the fourth connector, respectively.

While the first battery and the second battery are charged, the control unit may adjust a voltage balance between the first battery and the second battery by controlling the plurality of second relays such that the plurality of second relays are turned on or off respectively, when a voltage difference between the first battery and the second battery occurs.

When the first battery is fully charged and a voltage difference between the first battery and the second battery occurs, the control unit controls the second relay arranged on the charging line connected to the first battery such that the second relay is turned off and controls the second relay arranged on the charging line connected to the second battery such that the second relay is turned on.

The apparatus may further include a coupler having one end connected to the plurality of second relays and an opposite end connected to a plurality of charging terminals.

When the driving power of the first battery and the second battery is output through first and second output terminals through which the driving power of the first battery and the second battery is output, the control unit may control the first relay such that the first relay is turned on and the plurality of second relays such that the plurality of second relays are tuned off.

The driving power of the first battery and the second battery may be output, a second terminal of the first battery may be electrically connected to a first terminal of the second battery through the first relay. In addition, a first terminal of the first battery may be electrically connected to the first output terminal, and a second terminal of the second battery may be electrically connected to the second output terminal.

Each voltage capacity of the first battery and the second battery may be approximately half a voltage capacity of a commercial electric vehicle.

Each of the first battery and the second battery may have a range of voltage from 250 V to 420 V.

According to another aspect of the present disclosure, an apparatus for controlling the charging of an electric vehicle includes a switch unit including a first relay and a plurality of second relays, wherein the first relay is arranged on an electric line through which a first battery is connected in series to a second battery, the first battery and the second battery are capable of supplying driving power for the electric vehicle, and the plurality of second relays are arranged on a charging line through which charging power is supplied to the first battery or the second battery, and a control unit configured to control the first relay and the plurality of second relays such that the first relay can be turned off and the plurality of second relays can be turned on to supply the charging power supplied from a plurality of chargers to the first battery or the second battery, respectively, when the first battery and the second battery are charged.

The switch unit may include a first connector that connects an output terminal, to which the driving power of the first battery and the second battery is output, and a first charging terminal to a first terminal of the first battery, respectively, a second connector that connects the first charging terminal to a second terminal of the first battery, a third connector that connects a second charging terminal to a first terminal of the second battery, and a fourth connector that connects the output terminal and an second charging terminal to a second terminal of the second battery.

The second connector and the third connector may be connected to each other through an electric line, and the first relay may be arranged on the electric line.

When the first battery and the second battery are charged, the first terminal and the second terminal of the first battery may be electrically connected to the first charging terminal through the first connector and the second connector, and the first terminal and the second terminal of the second battery may be electrically connected to the second charging terminal through the third connector and the fourth connector.

When the driving power of the first battery and the second battery is output through output terminals through which the driving power of the first battery and the second battery is output, the control unit may control the first relay such that the first relay is turned on and the plurality of second relays such that the plurality of second relays are turned off.

When the driving power of the first battery and the second battery is output, a second terminal of the first battery may be electrically connected to a first terminal of the second battery through the first relay. In addition, a first terminal of the first battery may be electrically connected to a first output terminal, and a second terminal of the second battery may be electrically connected to an output terminal.

Each voltage capacity of the first battery and the second battery may be approximately half a voltage capacity of a commercial electric vehicle.

According to still another aspect of the present disclosure, an apparatus for controlling the charging of an electric vehicle includes a switch unit including a first relay and a plurality of second relays, wherein the first relay is arranged on an electric line through which a first battery is connected in series to a second battery, the first battery and the second battery are capable of supplying driving power for the electric vehicle, and the plurality of second relays are arranged on charging lines through which charging power of a first voltage is supplied to the first battery and the second battery respectively, a first charging terminal connected to a charger of the first voltage, a second charging terminal connected to a charger of a second voltage, which is higher than the first voltage, and a control unit configured to control the first relay and the plurality of second relays such that the first relay can be turned off and the plurality of second relays can be turned on, when the first battery and the second battery are charged with the charging power supplied from the first charging terminal, and to control the first relay and the plurality of second relays such that the first relay is turned on and the plurality of second relays are turned off when the first battery and the second battery are charged with the charging power supplied through the second charging terminal.

The first voltage may be half the second voltage.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
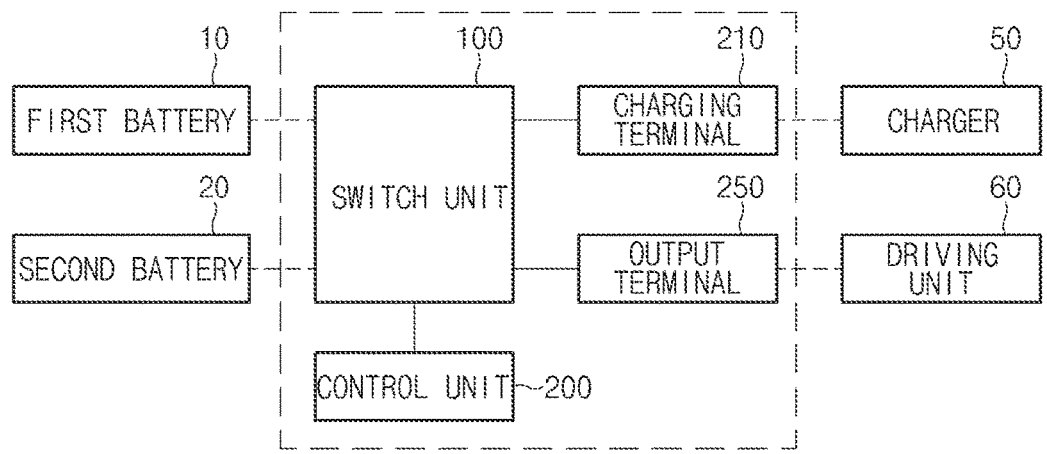
FIG. 1 is a block diagram illustrating a configuration of an apparatus for controlling the charging of an electric vehicle according to the present disclosure.

Hereinafter, exemplary embodiments of the present disclosure will be described in detail with reference to the accompanying drawings. It should be noted that in assigning reference numerals to elements in the drawings, the same elements will be designated by the same reference numerals although they are shown in different drawings. Further, in the following description of the present disclosure, a detailed description of known functions and configurations incorporated herein will be omitted when it makes the subject matter of the present disclosure unclear.

In addition, terms, such as first, second. A, B. (a), (b) or the like may be used herein when describing components of the present disclosure. Each of these terminologies is not used to define an essence, order or sequence of a corresponding component but used merely to distinguish the corresponding component from other component(s). Unless otherwise defined, all terms used herein, including technical or scientific terms, have the same meanings as those generally understood by those skilled in the art to which the present disclosure pertains.

FIG. 1 is a block diagram illustrating a configuration of an apparatus for controlling the charging of an electric vehicle according to an embodiment of the present disclosure.

As shown in FIG. 1, an apparatus for controlling the charging of an electric vehicle according to an embodiment of the present disclosure may include a charging terminal 210 for receiving charging power from a charger 50 and transferring the charging power, an output terminal 250 through which driving power is output to a driving unit 60, a switch unit 100 for switching signal flows between first and second batteries 10 and 20, the charging terminal 210, and the output terminal 250, and a control unit 200 for controlling on/off operations of switches of the switch unit 100 based on charging or discharging states of the first and second batteries 10 and 20.

In this case, the first and second batteries 10 and 20 are provided in an electric vehicle, for example, a commercial electric vehicle such as an electric bus, requiring driving power of 600 V or more to supply the driving power. In this case, the first and second batteries 10 and 20 may be batteries each of which has half the voltage capacity required by the commercial electric vehicle. For example, the first and second batteries 10 and 20 may be batteries each of which has a range of voltage from 250 V to 420 V.

The switch unit 100 may include a plurality of connectors (not shown) and a plurality of relays (not shown) arranged on an electric line or a charging line connected to the connectors.

Hereinafter, the operation of the control unit 200 for controlling the on/off operations of the relays based on the charging or discharging states of the first and second batteries 10 and 20 will be described in detail with reference to FIGS. 2 to 7.

Figure 2:
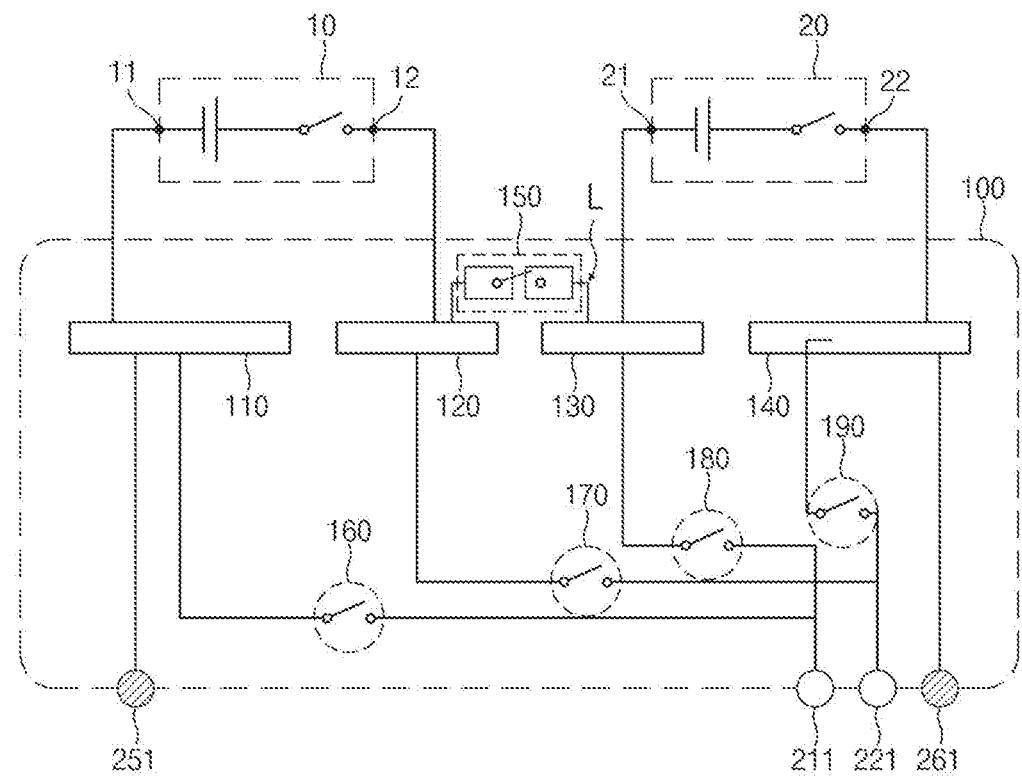
FIG. 2 is a circuit diagram illustrating a configuration of an apparatus for controlling the charging of an electric vehicle according to a first embodiment of the present disclosure.

FIG. 2 is a circuit diagram illustrating a configuration of an apparatus for controlling the charging of an electric vehicle according to a first embodiment of the present disclosure, where a plurality of batteries are charged by using one charger 50.

As shown in FIG. 2, the apparatus for controlling the charging of an electric vehicle according to the first embodiment of the present disclosure may include first and second connectors 110 and 120 connected to a first battery 10, and third and fourth connectors 130 and 140 connected to a second battery 20.

The first connector 110 may be connected to a first terminal 11 of the first battery 10, and the second connector 120 may be connected to a second terminal 12 of the first battery 10. In addition, the third connector 130 may be connected to a first terminal 21 of the second battery 20, and the fourth connector 140 may be connected to a second terminal 22 of the second battery 20.

In this case, the second and third connectors 120 and 130 are connected to each other through an electric line L. Thus, the second terminal 12 of the first battery 10 and the first terminal 21 of the second battery 20 may be connected to each other through the electric line through which the second and third connectors 120 and 130 are connected to each other. In addition, a first relay 150 may be arranged in the electric line through which the second and third connectors 120 and 130 are connected to each other.

The first to fourth connectors 110 to 140 connect the first and second batteries 10 and 20, the charging terminals 211 and 221, and/or the output terminals 251 and 261 to each other.

For example, the first connector 110 connects a first terminal 211 of the charging terminal, a first terminal 251 of the output terminal, and the first terminal 11 of the first battery 10 to each other. In addition, the second connector 120 connects the second terminal 221 of the charging terminal and the second terminal 12 of the first battery 10. In addition, the third connector 130 connects the first terminal 211 of the charging terminal and the first terminal 21 of the second battery 20 to each other. In addition, the fourth connector 140 connects the second terminal 221 of the charging terminal, a second terminal 261 of the output terminal, and the second terminal 22 of the second battery 20 to each other. In this case, the first and third connectors 110 and 130 may be connected to the first terminal 211 of the charging terminal, and the second and fourth connectors 120 and 140 may be connected to the second terminal 221 of the charging terminal.

In this case, the second relays 160 to 190 may be arranged on charging lines between the first to fourth connectors 110 to 140 and the charging terminal 211 and 221, respectively.

The first relay 150 and the second relays 160 to 190 may be controlled to be turned on or off by the control unit 200. In this case, the turn-on states of the first relay 150 and the second relays 160 to 190 mean the state that the relay switches are short circuited to be electrically connected. Meanwhile, the turn-off states of the first relay 150 and the second relays 160 to 190 mean the state that the relay switches are open circuited to be electrically cut off.

The charging terminals 211 and 221 may be connected to the charger 50 for supplying the charging power to the first and second batteries 10 and 20. For example, the charger 50 may supply the charging power of 300 V to the first and second batteries 10 and 20, respectively.

When the first and second batteries 10 and 20 are charged with the charging power supplied from the charger 50, the control unit 200 controls the first relay 150 to be tuned off such that the second connector 120 is electrically open-circuited with the third connector 130. After the first relay 150 is controlled to be turned off the control unit 200 controls the second relays 160 to 190 arranged between the first to fourth connector 110 to 140 and the charging terminals 211 and 221 to be turned on, such that the charging power of the charger 50 is supplied to the first and second batteries 10 and 20, respectively.

In this case, the control unit 200 may check the charged states of the first and second batteries 10 and 20. When a voltage difference between the first and second batteries 10 and 20 occurs, the control unit 200 may control a corresponding relay to adjust a voltage balance between the first and second batteries 10 and 20.

For example, when a voltage of the first battery 10 is higher than that of the second battery 20 in charging the first and second batteries 10 and 20, the control unit 200 may control the second relays 160 to 190 arranged on the charging lines connected between the first and second connectors 110 and 120, such that the second relays 160 to 190 are tuned off after the first battery 10 is fully charged. In this case, the charging power supplied from the charger 50 may be supplied only to the second battery 20.

Meanwhile, when the driving power of the first and second batteries 10 and 20 is output to the driving unit 60 connected to the output terminal, the control unit 100 controls the second relays 160 to 190 arranged on the charging lines between the first to fourth connectors 110 to 140 and the charging terminals such that the second relays 160 to 190 are turned off to prevent the driving power of the first and second batteries 10 to 20 from flowing out through the charging lines.

In addition, the control unit 200 controls the first relay 150 to be turned on such that the second and third connectors 120 and 130 are electrically connected to each other. When the second and third connectors 120 and 130 are electrically connected to each other, the second terminal 12 of the first battery 10 is electrically connected to the first terminal 21 of the second battery 20, so that the first and second batteries 10 and 20 are connected in series to each other.

Therefore, since the first and second batteries 10 and 20 are connected in series to each other, the driving power corresponding to the sum of the voltage capacities of the first and second batteries 10 and 20 may be output through the output terminals 251 and 261.

Figure 3A:
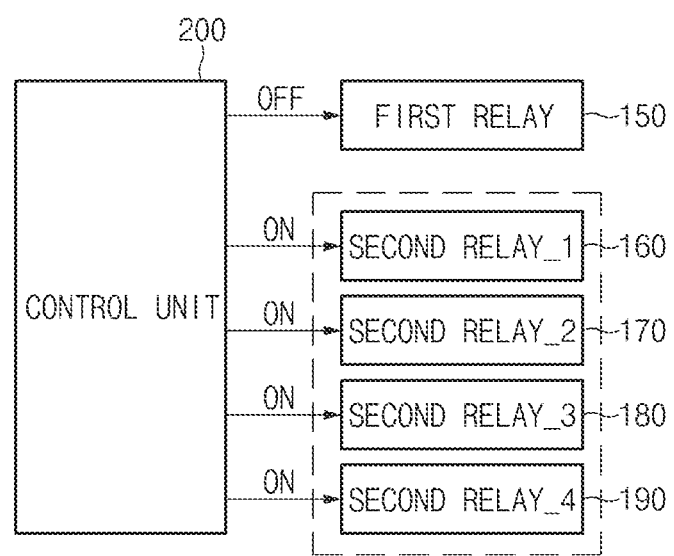
FIGS. 3A and 3B are views illustrating a relay connection state in charging the batteries according to the first embodiment of the present disclosure.
Figure 3B:
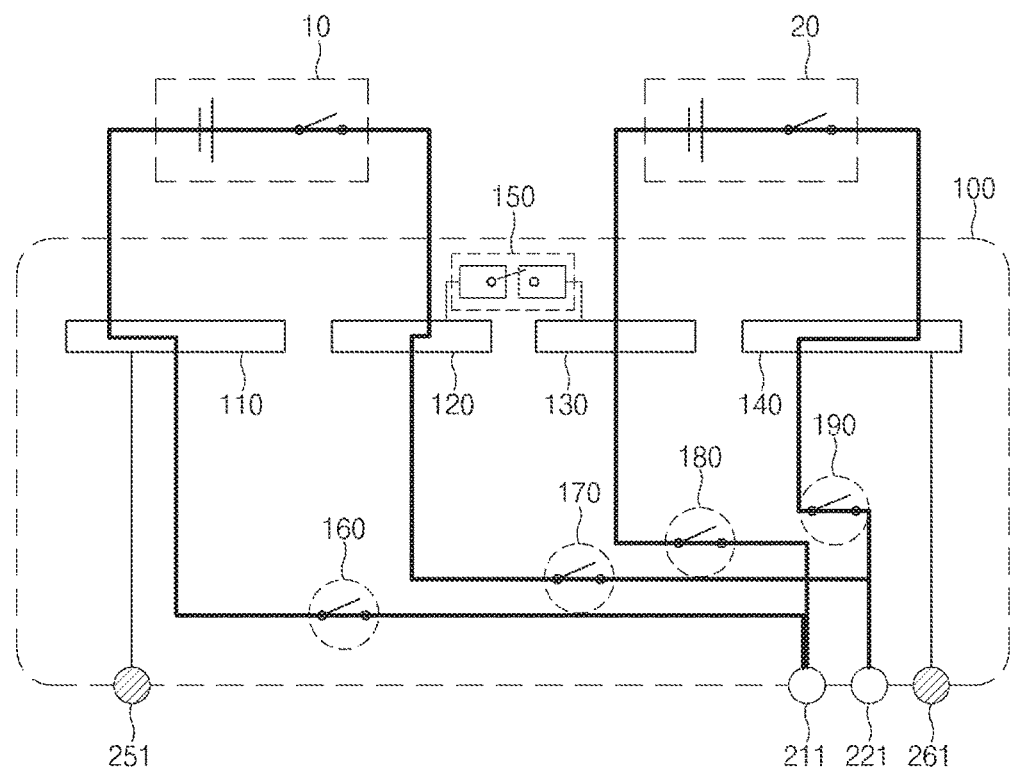

FIGS. 3A and 3B are views illustrating a state that the relays are connected to each other in charging the batteries according to the first embodiment of the present disclosure.

As shown in FIG. 3A, when the first and second batteries 10 and 20 are charged, the control unit 200 outputs a turn-off control signal to the first relay 150 and outputs turn-on control signals to the second relays 160 to 190.

As shown in FIG. 3B, when the first and second batteries 10 and 20 are charged, the first relay 150, which is arranged on the electric line through which the second and third connectors 120 and 130 are connected, is tuned off in response to the turn off control signal of the control unit 200. Thus, the second and third connectors 120 and 130 are electrically cut off.

In addition, the second relays 160 to 190, which are arranged on the charging lines between the first to fourth connectors 110 to 140 and the charging terminals, are tuned on in response to turn-on control signals of the control unit 200.

Therefore, the first battery 10 receives the charging power through the charging lines connected to the second relay 160, the first and second connectors 110 and 120, and the second relay 170. In addition, the second battery 20 receives the charging power through the charging lines connected to the second relay 180, the third and fourth connectors 130 and 140, and the second relay 190.

As described above, according to the present disclosure, the first and second batteries 10 and 20 may be implemented with batteries each having a voltage capacity of 300 V and may be charged using a charger for a passenger electric vehicle.

Figure 4A:
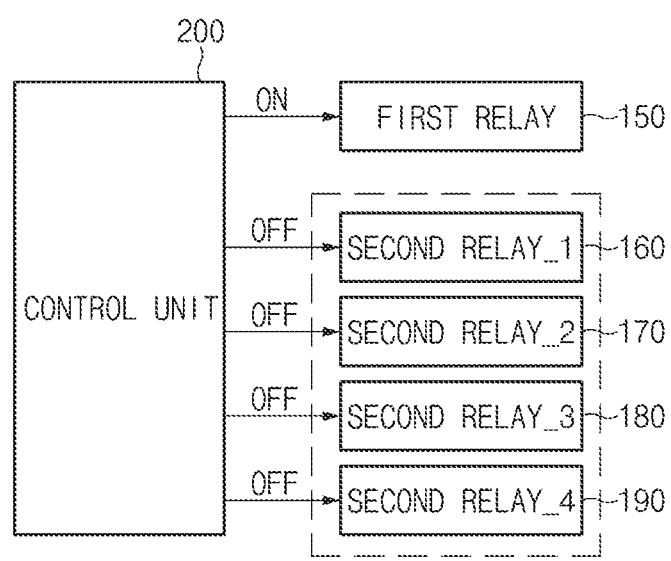
FIGS. 4A and 4B are views illustrating a relay connection state when the driving power is output from the batteries according to the first embodiment of the present disclosure.
Figure 4B:
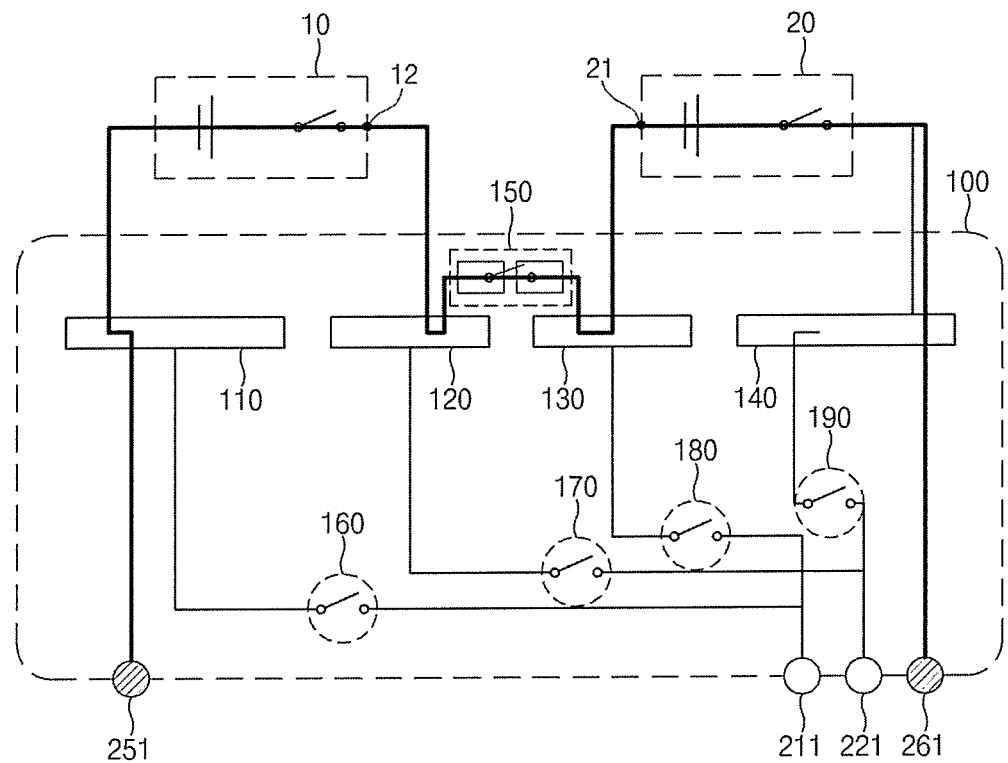

FIGS. 4A and 4B are views illustrating a relay connection state when the driving power is output from the batteries according to the first embodiment.

As shown in FIG. 4A, when the driving power is output from the first and second batteries 10 and 20, the control unit 200 outputs a turn-on control signal to the first relay 150 and outputs the turn-off control signal to the second relays 160 to 190.

As shown in FIG. 4B, when the driving power is output from the first and second batteries 10 and 20, the second relays 160 to 190, which are arranged on the charging lines between the first to fourth connectors 110 to 140 and the charging terminals, are turned off in response to the turn-off control signal of the control unit 200.

In addition, the first relay 150, which is arranged on the electric line through which the second and third connectors 120 and 130 are connected, is turned on in response to the turn-on control signal of the control unit 200. In this case, the second and third connectors 120 and 130 are electrically connected to each other, so that the second terminal 12 of the first battery 10 is electrically connected to the first terminal 21 of the second battery 20.

Therefore, the first and second batteries 10 and 20 output the driving power to the driving unit 60 of the electric vehicle through the output terminals 251 and 261 connected to the first and fourth connectors 110 and 140.

Figure 5:
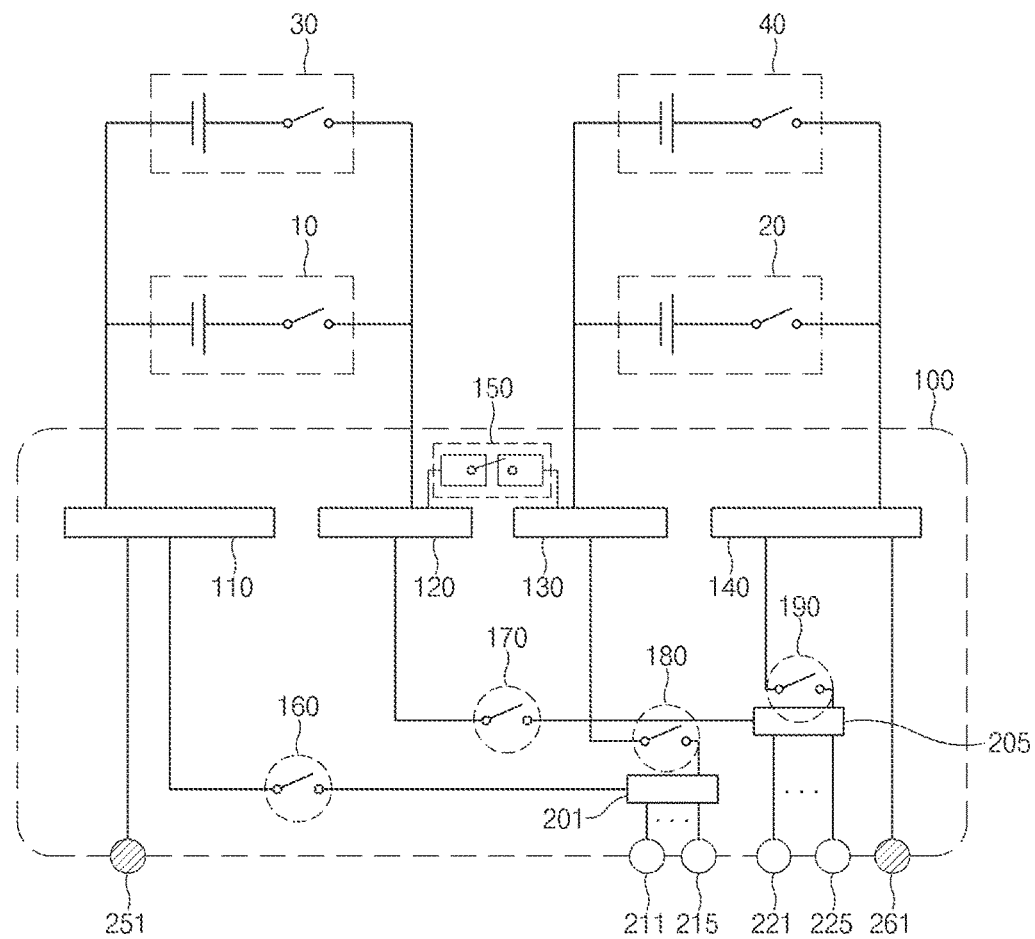
FIG. 5 is a circuit diagram illustrating a configuration of an apparatus for controlling the charging of an electric vehicle according to a second embodiment of the present disclosure.

FIG. 5 is a circuit diagram illustrating a configuration of an apparatus for controlling the charging of an electric vehicle according to a second embodiment of the present disclosure, where a plurality of batteries are charged by using a plurality of chargers 50.

As shown in FIG. 5, the apparatus for controlling the charging of an electric vehicle according to the second embodiment of the present disclosure may include a further coupler provided to the apparatus for controlling the charging of an electric vehicle according to the first embodiment. In this case, a third battery 30 connected in parallel to the first battery 10 and a fourth battery 40 connected in parallel to the second battery 20 are further included.

In this case, the coupler may include a first coupler 201 connected to the first and third connectors 110 and 130 and a second coupler 205 connected to the second and fourth connectors 120 and 140.

First terminals 211 to 215 of one or more charging terminals nay be connected to the first coupler 201, and second terminals 221 to 225 of one or more charging terminals may be connected to the second coupler 205.

Like the first embodiment, in the second embodiment, when the first to fourth batteries 10 to 40 are charged with the charging power supplied from the chargers 50, the control unit 200 controls the first relay 150 and second relays 160 to 190 such that the first relay 150 is tuned off and the second relays 160 to 190 are tuned on, thereby supplying the charging power to the first to fourth batteries 10 to 40.

However, in the second embodiment, since the plurality of charging terminals 211 to 215 and 221 to 225 are provided through the couplers 201 and 205, the plurality of chargers 50 may be connected through the plurality of charging terminals 211 to 215 and 221 to 225.

That is, the first terminals 211 to 215 of the charging terminals are connected to the first and third connectors 110 and 130, and the second terminals 221 to 225 of the charging terminals are connected to the second and fourth connectors 120 and 140, respectively. Therefore, the charging power supplied from the chargers 50 connected to the charging terminals 211 to 215 and 221 to 225 may be supplied to the first to fourth batteries 10 to 40.

According to the second embodiment, the batteries 10 to 40 are charged by using the chargers 50, so that the charging times of the batteries 10 to 40 may be reduced.

Figure 6:
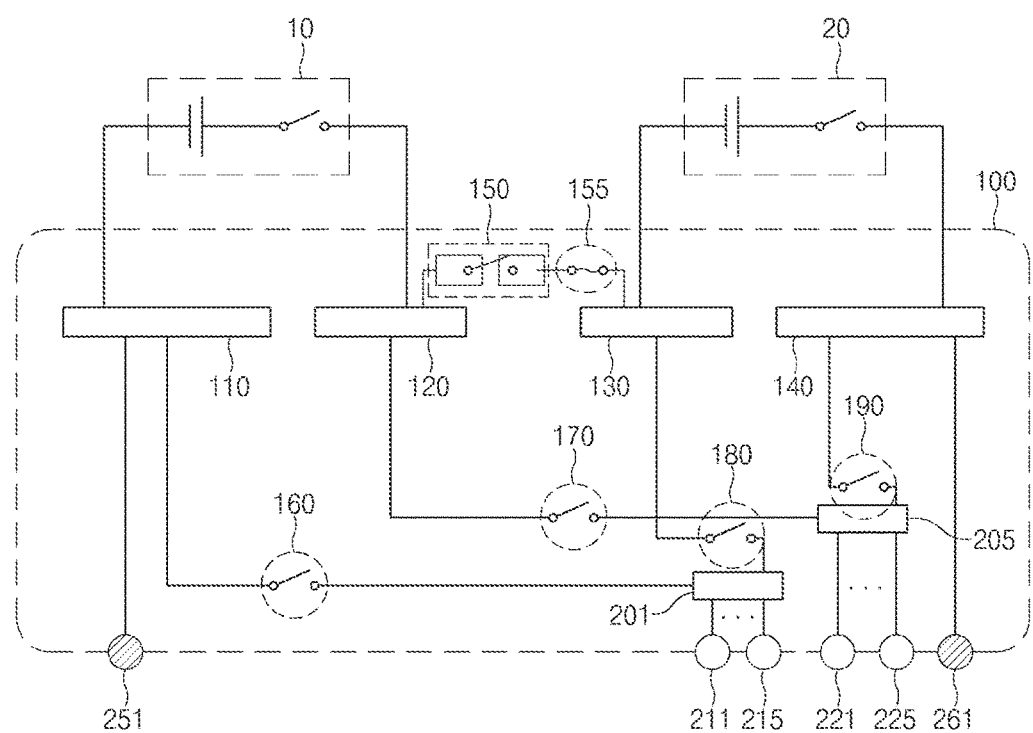
FIG. 6 is a circuit diagram illustrating a configuration of an apparatus for controlling the charging of an electric vehicle according to a third embodiment of the present disclosure and FIG. 7 is a circuit diagram illustrating a configuration of an apparatus for controlling the charging of an electric vehicle according to a fourth embodiment of the present disclosure.

FIG. 6 is a circuit diagram illustrating a configuration of an apparatus for controlling the charging of a electric vehicle according to a third embodiment of the present disclosure, where a plurality of batteries is charged by using a plurality of chargers 50.

According to the third embodiment, a plurality of batteries may be charged by using both chargers for a passenger electric vehicle and a commercial electric vehicle.

As shown in FIG. 6, the apparatus for controlling the charging of an electric vehicle according to the third embodiment of the present disclosure may include a plurality of first charging terminals 211 to 215 and 221 to 225 connected to a first charger (not shown) for supplying charging power in the range of voltage from 250 V to 420 V for a passenger electric vehicle, and a second charging terminal connected to a second charger (not shown) for supplying charging power in the range of voltage from 500 V to 840 V for a commercial electric vehicle.

Like the charging terminal described in the second embodiment, the first charging terminals 211 to 215 and 221 to 225 may include a plurality of charging terminals 211 to 215 and 221 to 225 that are connected to first to fourth connectors 110 to 140 through couplers 201 and 205, respectively. Thus, the charging power of the range of voltages from 250 V to 420 V may be supplied from the first charger to the first and second batteries 10 and 20 through the first charging terminals 211 to 215 and 221 to 225.

As described above, when the first and second batteries 10 and 20 are supplied through the first charging terminals 211 to 215 and 221 to 225, the control unit 200 controls the first relay 150 and the second relays 160 to 190 such that the first relay 150 is tuned off and the second relays 160 to 190 are turned on.

Meanwhile, the second charging terminal may be used as an output terminal 251 and 261 through which the driving power of the first and second batteries 10 and 20 is output. Thus, the charging power of the range of voltages from 500 V to 840 V supplied from the second charger may be supplied to the first and second batteries 10 and 20 through the second charging terminal.

When the first and second batteries 10 and 20 are charged through the second charging terminal, the control unit 200 controls the first relay 150 and the second relays 160 to 190 such that the first relay 150 is turned on and the second relays 160 to 190 are turned off.

When the first relay 150 is turned on, the first and second batteries 10 and 20 are connected in series to each other, so that the charging power of the range of voltages from 500 V to 840 V supplied through the second charging terminal may be distributed into the first and second batteries 10 and 20.

A safety plug 155 such as a fuse may be additionally arranged between the first and second batteries 10 and 20.

In this case, like the first relay 150, the safety plug 155 may be arranged on the electric line through which the second and third connector 120 and 130 are connected to each other. In this case, while the first and second batteries 10 and 20 each having the range of voltages from 250 V to 420 V are charged with the charging power of the range of voltages from 500 V to 840 V supplied through the second charging terminal, the safety plug 155 blocks an overcurrent occurring between the first and second batteries 10 and 20.

Figure 7:
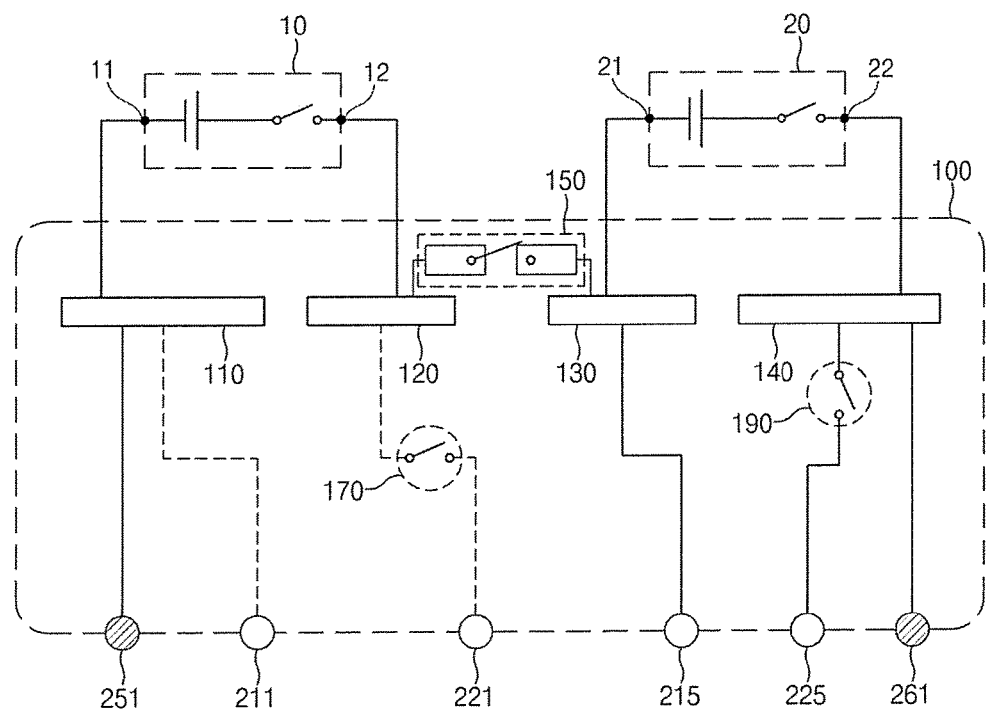

FIG. 7 is a circuit diagram illustrating a configuration of an apparatus for controlling the charging of an electric vehicle according to a fourth embodiment of the present disclosure, where a plurality of batteries is charged by using a plurality of chargers 50.

However, although the plurality of charging terminals are implemented using couplers as in the second and third embodiments, the fourth embodiment provides charging terminals corresponding to the first and fourth connectors 110 and 140.

Referring to FIG. 7, the apparatus for controlling the charging of an electric vehicle according to the fourth embodiment of the present disclosure may include the first and second connectors 110 and 120 connected to the first battery 10, and the third and fourth connectors 130 and 140 connected to the second battery 20.

The first connector 110 connects a charging terminal, a output terminal and a first terminal 11 of the first battery 10 to each other. The second connector 120 connects a charging terminal and a second terminal 12 of the first battery 10. In addition, the third connector 130 connects a charging terminal and a first terminal 21 of the second battery 20, and the fourth connector 140 connects a charging terminal, a output terminal and a second terminal 22 of the second battery 20 to each other.

In this case, the first and second connectors 110 and 120 may be connected to first and second terminals 211 and 221 of a first charging terminal, and the third and fourth connectors 130 and 140 may be connected first and second terminals 215 and 225 of a second charging terminal. Thus, the charger 50 connected to the first charging terminal 211 and 221 supplies the charging power of the range of voltages from 250 V to 420 V to the first battery 10 through the first charging terminal 211 and 221. In addition, the charger 50 connected to the second charging terminal 215 and 225 supplies the charging power of the range of voltages from 250 V to 420 V to the second battery 20 through the second charging terminal 215 and 225.

In this case, the second and third connectors 120 and 130 may be connected to each other through an electric line, and the second terminal 12 of the first battery 10 and the first terminal 21 of the second battery 20 may be connected to each other through a electric line through which the second and third connectors 120 and 130 are connected to each other. In addition, the first relay 150 may be arranged on the electric line through which the second and third connectors 120 and 130 are connected to each other.

In addition, second relays 170 and 190 may be arranged on charging lines between the second connector 120 and the first charging terminal, and between the fourth connector 140 and the second charging terminal, respectively.

The first relay 150 and the second relays 170 and 190 may be turned on or off under control of the control unit 200.

When two chargers 50 are connected to the first charging terminal 211 and 221 and the second charging terminal 215 and 225, respectively, the control unit 200 controls the first relay 150 such that the second connector 120 is electrically open-circuited with the third connector 130. In addition, the control unit 200 controls the second relays 170 and 190 arranged on the charging lines connected to the second and fourth connectors 120 and 140, such that the charging power input through the first charging terminal 211 and 221 is supplied to the first battery 10 and the charging power input through the second charging terminal 215 and 225 is supplied to the second battery 20.

Of course, when the driving power from the first and second batteries 10 and 20 is to be output to the driving unit 60 through the output terminal 251 and 261, the control unit 200 controls the second relays 170 and 190 such that the second relays 170 and 190 are turned off and controls the first relay 150 such that the first relay 150 is turned on. Thus, the first relay 150 is short circuited, so that the first and second batteries 10 and 20, which are connected in series to each other, output the driving power of 686 V to the driving unit 60 through the output terminal 251 and 261.

According to the present disclosure, a plurality of batteries for a passenger electric vehicle, are mounted on a commercial electric vehicle and connected in series/parallel to each other, so that it is possible to charge the batteries with a charger for the passenger electric vehicle without using an expensive charger of 600 V or more while meeting a voltage system requirements of the commercial electric vehicle, thereby reducing the cost.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The scope of the present disclosure should be understood by the claims below, and all the technical concepts within the equivalent scopes should be interpreted to be within the scope of the right of the present disclosure.

What is claimed is:

1. An apparatus for controlling the charging of an electric vehicle, the apparatus comprising:
   a switch unit including a first relay and a plurality of second relays, wherein the first relay is arranged between a first battery and a second battery, the first battery and the second battery are supply driving power for the electric vehicle, and the plurality of second relays are arranged between charging terminals and terminals of the first battery and the second battery, respectively, the charging terminals being connected to a charger; and
   a control unit configured to:
      control the first relay and the plurality of second relays such that the first relay is turned off and the plurality of second relays are turned on to supply the charging power of a charger connected to a charging terminal to the first battery and the second battery, respectively, when the first battery and the second battery are charged; and
      control the first relay and the plurality of second relays such that the first relay is turned on and the plurality of second relays are turned off when the driving power of the first battery and the second battery is output through first and second output terminals through which the driving power of the first battery and the second battery is output.

2. The apparatus of claim 1,
   further comprising a plurality of output terminals,
   the charging terminal comprises first and second charging terminals, and
   wherein the switch unit includes:
   a first connector configured to connect one of the output terminals, to which the driving power of the first battery and the second battery is output, to the first charging terminal and a first terminal of the first battery, respectively;
   a second connector configured to connect the second charging terminal to a second terminal of the first battery;
   a third connector configured to connect the first charging terminal to the first terminal of the second battery; and
   a fourth connector configured to connect one of the output terminals and the second charging terminal to the second terminal of the second battery.

3. The apparatus of claim 2, wherein the second connector and the third connector are connected to each other through an electric line, and
   the first relay is arranged on the electric line.

4. The apparatus of claim 2, wherein,
   when the first battery and the second battery are charged, the first terminal of the first battery and the first terminal of the second battery are electrically connected to the first charging terminal through the first connector and the third connector, respectively, and
   the second terminal of the first battery and the second terminal of the second battery are electrically connected to the second charging terminal through the second connector and the fourth connector, respectively.

5. The apparatus of claim 1, wherein, while the first battery and the second battery are charged, the control unit adjusts a voltage balance between the first battery and the second battery by controlling the plurality of second relays such that the plurality of second relays are turned on or off, respectively, when a voltage difference between the first battery and the second battery occurs.

6. The apparatus of claim 5, wherein, when the first battery is fully charged and a voltage difference between the first battery and the second battery occurs, the control unit controls the second relay arranged on the charging line connected to the first battery such that the second relay is turned off and controls the second relay arranged on the charging line connected to the second battery such that the second relay is turned on.

7. The apparatus of claim 1, wherein the charging terminal further comprises a plurality of charging terminals and wherein the apparatus further comprises a coupler having one end connected to the plurality of second relays and an opposite end connected to the plurality of charging terminals.

8. The apparatus of claim 1, wherein, when the driving power of the first battery and the second battery is output, a second terminal of the first battery is electrically connected to a first terminal of the second battery through the first relay,
   wherein a first terminal of the first battery is electrically connected to the first output terminal, and
   wherein a second terminal of the second battery is electrically connected to the second output terminal.

9. The apparatus of claim 1, wherein each voltage capacity of the first battery and the second battery is approximately half of a voltage capacity of a commercial electric vehicle.

10. The apparatus of claim 9, wherein each of the first battery and the second battery has a range of voltage from 250 V to 420 V.

11. An apparatus for controlling the charging of an electric vehicle, the apparatus comprising:
    a switch unit including a first relay and a plurality of second relays, wherein the first relay is arranged between a first battery and a second battery, the first battery and the second battery supply driving power for the electric vehicle, and the plurality of second relays are arranged between charging terminals and terminals of the first battery and the second battery, respectively, the charging terminals being connected to a charger; and
    a control unit configured to:
       control the first relay and the plurality of second relays such that the first relay is turned off and the plurality of second relays are turned on to supply the charging power supplied from a plurality of chargers to the first battery or the second battery, respectively, when the first battery and the second battery are charged; and
       control the first relay and the plurality of second relays such that the first relay is turned on and the plurality of second relays are turned off when the driving power of the first battery and the second battery is output through output terminals through which the driving power of the first battery and the second battery is output.

12. The apparatus of claim 11, wherein the switch unit includes:

a first connector configured to connect an output terminal, to which the driving power of the first battery and the second battery is output, and a first charging terminal to a first terminal of the first battery, respectively;

a second connector configured to connect the first charging terminal to a second terminal of the first battery;

a third connector configured to connect a second charging terminal to a first terminal of the second battery; and a fourth connector configured to connect an output terminal and the second charging terminal to a second terminal of the second battery.

13. The apparatus of claim 12, wherein the second connector and the third connector are connected to each other through an electric line, and the first relay is arranged on the electric line.

14. The apparatus of claim 12, wherein, when the first battery and the second battery are charged, the first terminal and the second terminal of the first battery are electrically connected to the first charging terminal through the first connector and the second connector, and wherein the first terminal and the second terminal of the second battery are electrically connected to the second charging terminal through the third connector and the fourth connector.

15. The apparatus of claim 11, wherein, when the driving power of the first battery and the second battery is output, a second terminal of the first battery is electrically connected to a first terminal of the second battery through the first relay, wherein a first terminal of the first battery is electrically connected to a first output terminal, and wherein a second terminal of the second battery is electrically connected to a second output terminal.

16. The apparatus of claim 11, wherein each voltage capacity of the first battery and the second battery is approximately half of a voltage capacity of a commercial electric vehicle.

17. An apparatus for controlling the charging of an electric vehicle, the apparatus comprising:

a switch unit including a first relay and a plurality of second relays, wherein the first relay is arranged between a first battery and a second battery, the first battery and the second battery supply driving power for the electric vehicle, and the plurality of second relays are arranged between charging terminals and terminals of the first battery and the second battery, respectively;

a first charging terminal connected to a charger of a first voltage;

a second charging terminal connected to a charger of a second voltage, which is higher than the first voltage; and a control unit configured to:

control the first relay and the plurality of second relays such that the first relay is turned off and the plurality of second relays are turned on, when the first battery and the second battery are charged with the charging power supplied from the first charging terminal, and control the first relay and the plurality of second relays such that the first relay is turned on and the plurality of second relays are turned off when the first battery and the second battery are charged with the charging power supplied through the second charging terminal.

18. The apparatus of claim 17, wherein the first voltage is half the second voltage.

* * * * *